United States Patent

Bageshwar et al.

(10) Patent No.: US 10,309,784 B2
(45) Date of Patent: Jun. 4, 2019

(54) MERGING INTENSITIES IN A PHD FILTER BASED ON A SENSOR TRACK ID

(71) Applicant: Honeywell International Inc., Morristown, NJ (US)

(72) Inventors: Vibhor L. Bageshwar, Minneapolis, MN (US); Michael Ray Elgersma, Plymouth, MN (US); Eric A. Euteneuer, St. Anthony Village, MN (US)

(73) Assignee: Honeywell International Inc., Morris Plains, NJ (US)

( * ) Notice: Subject to any disclaimer, the term of this patent is extended or adjusted under 35 U.S.C. 154(b) by 895 days.

(21) Appl. No.: 14/448,808

(22) Filed: Jul. 31, 2014

(65) Prior Publication Data

US 2016/0033276 A1    Feb. 4, 2016

(51) Int. Cl.
*G01C 21/00* (2006.01)
*G01S 13/93* (2006.01)
(Continued)

(52) U.S. Cl.
CPC ............. *G01C 21/00* (2013.01); *G01B 21/16* (2013.01); *G01S 13/726* (2013.01); *G01S 13/86* (2013.01);
(Continued)

(58) Field of Classification Search
CPC ..................................................... G01C 21/00
(Continued)

(56) References Cited

U.S. PATENT DOCUMENTS

| 4,816,833 A | 3/1989 | Ferguson et al. |
| 5,390,133 A | 2/1995 | Sohie |

(Continued)

FOREIGN PATENT DOCUMENTS

| CN | 103345577 | 10/2013 |
| EP | 1533628 | 5/2005 |

(Continued)

OTHER PUBLICATIONS

Chen et al., "Multi-Sensor Data Integration for Autonomous Sense and Avoid", Mar. 29-31, 2011, pp. 1-14, Publisher: American Institute of Aeronautics and Astronautics, Published in: St. Louis, Missouri.

(Continued)

*Primary Examiner* — Ricky Ngon
(74) *Attorney, Agent, or Firm* — Fogg & Power LLC (57) ABSTRACT

In one embodiment, a method of tracking multiple objects with a probabilistic hypothesis density filter is provided. The method includes generating a first intensity by combining a first one or more measurements, wherein a first set of track IDs associated with the first intensity includes track IDs corresponding to respective measurements in the first one or more measurements. A second intensity is generated by combining a second one or more measurements, wherein a second set of track IDs associated with the second intensity includes track IDs corresponding to respective measurements in the second one or more measurements. The first set of track IDs is compared to the second set of track IDs, and the first intensity is selectively merged with the second intensity based on whether any track IDs in the first set of track IDs match any track IDs in the second set of track IDs.

16 Claims, 3 Drawing Sheets

(51) Int. Cl.
G01S 13/72 (2006.01)
G01S 13/86 (2006.01)
G01B 21/16 (2006.01)

(52) U.S. Cl.
CPC .......... G01S 13/865 (2013.01); G01S 13/867 (2013.01); G01S 13/9303 (2013.01)

(58) Field of Classification Search
USPC .................................................. 702/150
See application file for complete search history.

(56) References Cited

U.S. PATENT DOCUMENTS

| | | | |
|---|---|---|---|
| 5,414,643 | A | 5/1995 | Blackman et al. |
| 5,798,942 | A | 8/1998 | Danchick et al. |
| 6,806,828 | B1 | 10/2004 | Sparrow et al. |
| 6,967,616 | B2 | 11/2005 | Etnyre |
| 7,218,270 | B1 | 5/2007 | Tamburino |
| 7,256,729 | B2 | 8/2007 | Bummerstede |
| 7,626,535 | B2 | 12/2009 | Ding et al. |
| 7,864,096 | B2 | 1/2011 | Stayton et al. |
| 8,378,881 | B2 | 2/2013 | LeMire et al. |
| 8,515,881 | B2 | 8/2013 | Schwoegler et al. |
| 2003/0042303 | A1 | 3/2003 | Tsikos et al. |
| 2003/0093187 | A1 | 5/2003 | Walker |
| 2004/0027274 | A1 | 2/2004 | Driessen et al. |
| 2004/0189521 | A1 | 9/2004 | Smith et al. |
| 2006/0008119 | A1 | 1/2006 | Chang et al. |
| 2008/0111730 | A1 | 5/2008 | Ding et al. |
| 2009/0212994 | A1 | 8/2009 | Hazma et al. |
| 2012/0206300 | A1* | 8/2012 | Allam .................. G01S 13/003 342/453 |
| 2012/0221273 | A1 | 8/2012 | Furukawa |
| 2012/0233098 | A1* | 9/2012 | Schwoegler .......... G06N 7/005 706/12 |
| 2013/0006577 | A1 | 1/2013 | Mathews et al. |
| 2013/0085661 | A1* | 4/2013 | Chan ...................... G05D 1/104 701/122 |
| 2013/0229298 | A1* | 9/2013 | Eckstein ............... G01S 13/726 342/107 |
| 2014/0055460 | A1 | 2/2014 | Furukawa |
| 2016/0162738 | A1 | 6/2016 | Miyano et al. |
| 2016/0350938 | A1 | 12/2016 | Maltese et al. |

FOREIGN PATENT DOCUMENTS

| | | | | |
|---|---|---|---|---|
| EP | 2228626 | A2 * | 9/2010 | ............ G01C 23/00 |
| WO | 2014011288 | | 1/2014 | |

OTHER PUBLICATIONS

Fasano et al., "Multi-Sensor Data fusion: A Tool to Enable UAS Integration into Civil Airspace", "30th Digital Avionics Systems Conference", Oct. 16-20, 2011, pp. 1-28, Published in: Seattle, WA.

Jovanoska et al., "Multiple target tracking by a distributed UWB sensor network based on the PHD filter", "2012 15th International Conference on Information Fusion", Jul. 9-12, 2012, pp. 1095-1102, Publisher: IEEE, Published in: DE.

Mahler, "Multitarget Bayes Filtering via First-Order Multitarget Moments", "IEEE Transactions on Aerospace and Electronic Systems", Oct. 2003, pp. 1152-1178, vol. 39, No. 4, Publisher: IEEE.

Panta et al., "Data Association and Track Management for the Gaussian Mixture Probability Hypothesis Density Filter", "IEEE Transactions on Aerospace and Electronics Systems", Jul. 2009, pp. 1003-1016, vol. 45, No. 3, Publisher: IEEE.

Vo et al., "Tha Gaussian Mixture Probability Hypothesis Density Filter", "IEEE Transactions Signal Processing", Nov. 2006, pp. 4091-4104, vol. 54, No. 11, Publisher: IEEE.

European Patent Office, "Extended European Search Report from EP Application No. 15177589.7 dated Dec. 17, 2015", from Foreign Counterpart of U.S. Appl. No. 14/448,808, dated Dec. 17, 2015, pp. 1-10, Published in: EP.

European Patent Office, "Extended European Search Report from EP Application No. 15177590.5 dated Dec. 22, 2015", from foreign counterpart of U.S. Appl. No. 14/448,803, dated Dec. 22, 2015, pp. 1-8, Published in: EP.

United States Patent and Trademark Office, "Final Office Action", From U.S. Appl. No. 14/448,803, dated Oct. 20, 2017, pp. 1-28, Published in: US.

United States Patent and Trademark Office, "Office Action", From U.S. Appl. No. 14/448,803, dated Mar. 6, 2017, pp. 1-33, Published in: US.

United States Patent and Trademark Office, "Office Action", From U.S. Appl. No. 14/448,803, dated Apr. 6, 2017, pp. 1-33, Published in: US.

Israel Patent Office Ministry of Justice, "Office Action", from Foreign Counterpart of U.S. Appl. No. 14/448/808, dated Sep. 2, 2017, pp. 1-2, Published in: IL.

European Patent Office, "Extended European Search Report from EP Application No. 15176942.9 dated Jan. 4, 2016", from Foreign Counterpart of U.S. Appl. No. 14/448,813, dated Jan. 4, 2016, pp. 1-8, Published in: EP.

United States Patent and Trademark Office, "Advisory Action", From U.S. Appl. No. 14/448,813, dated Mar. 9, 2017, pp. 1-4, Published in: US.

United States Patent and Trademark Office, "Final Office Action", From U.S. Appl. No. 14/448,813, dated Dec. 21, 2016, pp. 1-11, Published in: US.

United States Patent and Trademark Office, "Notice of Allowance", From U.S. Appl. No. 14/448,813, dated Aug. 22, 2017, pp. 1-8, Published in: US.

United States Patent and Trademark Office, "Office Action", From U.S. Appl. No. 14/448,813, dated Aug. 19, 2016, pp. 1-17, Published in: US.

United States Patent and Trademark Office, "Office Action", From U.S. Appl. No. 14/448,813, dated Apr. 26, 2017, pp. 1-10, Published in: US.

European Patent Office, "Communication under Rule 71(3) EPC", Foreign Counterpart to U.S. Appl. No. 14/448,819, dated Mar. 22, 2017, pp. 1-21, Published in: EP.

European Patent Office, "Extended European Search Report from EP Application No. 15177585.5 dated Dec. 21, 2015", from Foreign Counterpart of U.S. Appl. No. 14/448,819, dated Dec. 21, 2015, pp. 1-9, Published in: EP.

European Patent Office, "Office Action for EP Patent Application No. 15177585.5-1812", from Foreign counterpart of U.S. Appl. No. 14/448,819, dated Jul. 27, 2016, pp. 1-5, Published in: EP.

United States Patent and Trademark Office, "Advisory Action", From U.S. Appl. No. 14/448,819, dated Dec. 8, 2017, pp. 1-5, Published in: US.

United States Patent and Trademark Office, "Advisory Action", from U.S. Appl. No. 14/448/819, dated Dec. 26, 2017, pp. 1-5, Published in: U.S.

United States Patent and Trademark Office, "Final Office Action", From U.S. Appl. No. 14/448,819, dated Aug. 25, 2017, pp. 1-27, Published in: US.

United States Patent and Trademark Office, "Office Action", From U.S. Appl. No. 14/448,819, dated Feb. 24, 2017, pp. 1-41, Published in: US.

Danu et al., "Assignment-Based Particle Labeling for PHD Particle Filter", Signal and Data Processing of Small Targets, 2009, pp. 1-12, Publisher: Proceedings of SPIE vol. 7445.

Asseo, "Integration of Active and Passive Track Files From Internetted Aircraft for Enhanced Situation Awareness", May 23, 1988, pp. 242-250.

Clark et al., "Convergence Analysis of the Gaussian Mixture PHD Filter", IEEE Transactions on Signal Processing, Mar. 19, 2007, pp. 1-8, vol. 55, No. 4.

Clark, "Multiple Target Tracking with the Probability Hypothesis Density Filter", Ph.D. Thesis, Dept. of EECE, Heriot-Watt University, Oct. 2006, pp. 1-211.

Pace et al., "Comparison of Implementations of Gaussian Mixture PHD Filters", 2010 13th Conference on Information Fusion (Fusion), Jul. 26-29, 2010, pp. 1-11, Publisher: IEEE.

(56) References Cited

OTHER PUBLICATIONS

Panta et al., "Novel Data Association Schemes for the Probability Hypothesis Density Filter", IEEE Transactions on Aerospace and Electronics Systems, Apr. 1, 2007, pp. 556-570, vol. 43, No. 2.
Quang M Lam, "Probability Hypothesis Density Filter Based Design Concept: A Survey for Space Traffic Modeling and Control", Jun. 21, 2012.
Wang, "Outlier Detection Over Sliding Windows for Probabilistic Data Streams", Journal of Computer Science and Technology, May 2010, pp. 389-400, vol. 25, No. (3).
Zou, Zhou et al, "Radio Frequency Identification Enabled Wireless Sensing for Intelligent Food Logistics", Philosophical Transactions A 372: 20130313 retrieved from http://dx.doi.org/10.1098/rsta.2013.0313, May 5, 2014, pp. 1-17, Publisher: Royal Society Publishing.
United States Patent and Trademark Office, "Advisory Action", from U.S. Appl. No. 14/448,803, dated Jan. 31, 2018, pp. 1-5, Published in: US.
United States Patent and Trademark Office, "Office Action", from U.S. Appl. No. 14/448,803, dated Mar. 27, 2018, pp. 1-37, Published in: US.
Blasch et al., "Identifying Moving HRR Signatures With an ATR Belief Data Association Filter", Algorithms for Synthetic Aperture Radar Imagery VII, Aug. 24, 2000, pp. 1-11, Publisher: Proc. SPIE 4053.
State of Israel Patent Office, Notice of Defects in Patent Application No. 240076, dated May 18, 2018, Foreign Counterpart to U.S. Appl. No. 14/448,808, pp. 1-12, Published in: IL.
State of Israel Patent Office, Notice of Defects in Patent Application No. 240077, dated May 28, 2018, Foreign Counterpart to U.S. Appl. No. 14/448,803, pp. 1-15, Published in: IL.

\* cited by examiner

MERGING INTENSITIES IN A PHD FILTER BASED ON A SENSOR TRACK ID

CROSS-REFERENCE TO RELATED APPLICATIONS

This application is related to the following co-pending United States patent applications, which are hereby incorporated herein by reference:

U.S. patent application Ser. No. 14/448,803, published as US 2016/0033281, entitled "UPDATING INTENSITIES IN A PHD FILTER BASED ON A SENSOR TRACK ID" filed on even date herewith;

U.S. patent application Ser. No. 14/448,813, published as US 2016/0033633, entitled "ADJUSTING WEIGHT OF INTENSITY IN A PHD FILTER BASED ON SENSOR TRACK ID" filed on even date herewith; and U.S. patent application Ser. No. 14/448,819, published as US 2016/0033282, entitled "TWO STEP PRUNING IN A PHD FILTER" filed on even date herewith.

BACKGROUND

The objective of see-and-avoid or sense-and-avoid (SAA) is to provide an unmanned aircraft system (UAS) with the capability to perform self-separation and collision avoidance against all air traffic, with or without active, transponder based collision avoidance systems. SAA requires the UAS to detect and track intruder aircraft in the operating vicinity of the ownship aircraft to identify guidance maneuvers required to perform self-separation and collision avoidance. The detect and track functions are key enablers for UAS SAA capability because the UAS cannot perform self-separation or collision avoidance maneuvers for undetected, untracked intruder aircraft. The detect function refers to using surveillance sensors to measure the position of intruder aircraft relative to the ownship UAS. The track function refers to fusing the surveillance sensor measurements together to estimate the trajectory statistics (also referred to herein as the track) of the intruder aircraft relative to the ownship UAS. The surveillance sensors provide measurements with corresponding measurement IDs that can be correlated across time or random across time.

The track function estimates the tracks of the intruder aircraft using a data association algorithm to assign measurements to a current track, a filter to fuse sensor measurements with the current estimates of the track statistics, and a trajectory manager that oversees the sensor fusion operation, initiates tracks, maintains tracks, and deletes tracks.

One tracking system uses random finite sets (RFS) to track multiple intruder aircraft (IA) operating in the environment of the ownship UAS. RFS are part of a multi-hypothesis testing (MHT) approach to multiple IA tracking RFS casts the multiple IA tracking problem into a set-valued state space where the statistics of the set-value state vector and set-valued measurement vector are approximated using their first-order moments (also referred to herein as an intensity) and applied in a Bayesian filter framework to estimate the IA track statistics using Gaussian mixtures. The resulting filter is referred to as a probabilistic hypothesis density (PHD) filter. An intensity refers to a weight, a state mean vector, and a state covariance matrix of an element of the set-value state space where this element corresponds to the statistics of a track.

A basic PHD filter typically clusters new, current, and measurement-to-track intensities by comparing the Malhanobis distance between the statistics of two intensities. If this distance is below a user selected threshold, then the two intensities are considered to have originated from the same IA. This process involves comparing all possible intensity pairs to the threshold.

SUMMARY

In one embodiment, a method of tracking multiple objects with a probabilistic hypothesis density filter is provided. The method includes generating a first intensity by combining a first one or more measurements from a first one or more sensors, wherein a first set of track IDs includes one or more track IDs provided by the first one or more sensors corresponding to their respective measurement in the first one or more measurements, wherein the first intensity includes a weight, a state mean vector, and a state covariance matrix of statistics of a track of an object at a first time. A second intensity is generated by combining a second one or more measurements from a second one or more sensors, wherein a second set of track IDs includes one or more track IDs provided by the second one or more sensors corresponding to their respective measurement in the second one or more measurements, wherein the second intensity includes a weight, a state mean vector, and a state covariance matrix of statistics of a track of an object at the first time. The first set of track IDs is compared to the second set of track IDs, and the first intensity is selectively merged with the second intensity based on whether any track IDs in the first set of track IDs match any track IDs in the second set of track IDs.

DRAWINGS

Understanding that the drawings depict only exemplary embodiments and are not therefore to be considered limiting in scope, the exemplary embodiments will be described with additional specificity and detail through the use of the accompanying drawings, in which.

In accordance with common practice, the various described features are not drawn to scale but are drawn to emphasize specific features relevant to the exemplary embodiments.

DETAILED DESCRIPTION

The subject matter described herein provides for a method of merging intensities in a probabilistic hypothesis density (PHD) filter by using track identifiers (IDs) provided by one or more sensors obtaining object measurements corresponding to the intensities. A track ID is an identifier provided by a sensor, wherein the identifier is correlated across time to a series of measurements. One type of track ID is an international civil aviation organization (ICAO) aircraft address that is transmitted by an aircraft along with corresponding measurement information that is received by a sensor along with the corresponding measurement information. Examples of sensors that are able to receive such ICAO aircraft addresses include an automatic dependent surveillance-broadcast (ADS-B) sensor and a traffic collision avoidance system (TCAS) mode S sensor. Another type of track ID is an identifier from a sensor that correlates measurements over time. In particular, such sensors identify tracks of objects by correlating measurements over time and assigning an ID to those tracks. These IDs are provided by the sensor along with the measurements. Since these IDs are generated by a sensor that correlates its own measurements over time, these IDs are sensor specific. That is, even though a first sensor and a second sensor may be obtaining measurements of the same object, the first sensor and second sensor correlate their own measurements, not the measurements of the other sensor; therefore, the track ID provided by each sensor is different and corresponds to the measurements from that sensor not the other sensor. Examples of a sensor that provides such a track ID for correlated measurements include a TCAS mode C sensor, certain LiDARs, and certain radars. The subject matter described herein utilizes these track IDs to improve the accuracy and efficiency with which multiple objects can be tracked in a PHD filter.

Figure 1:
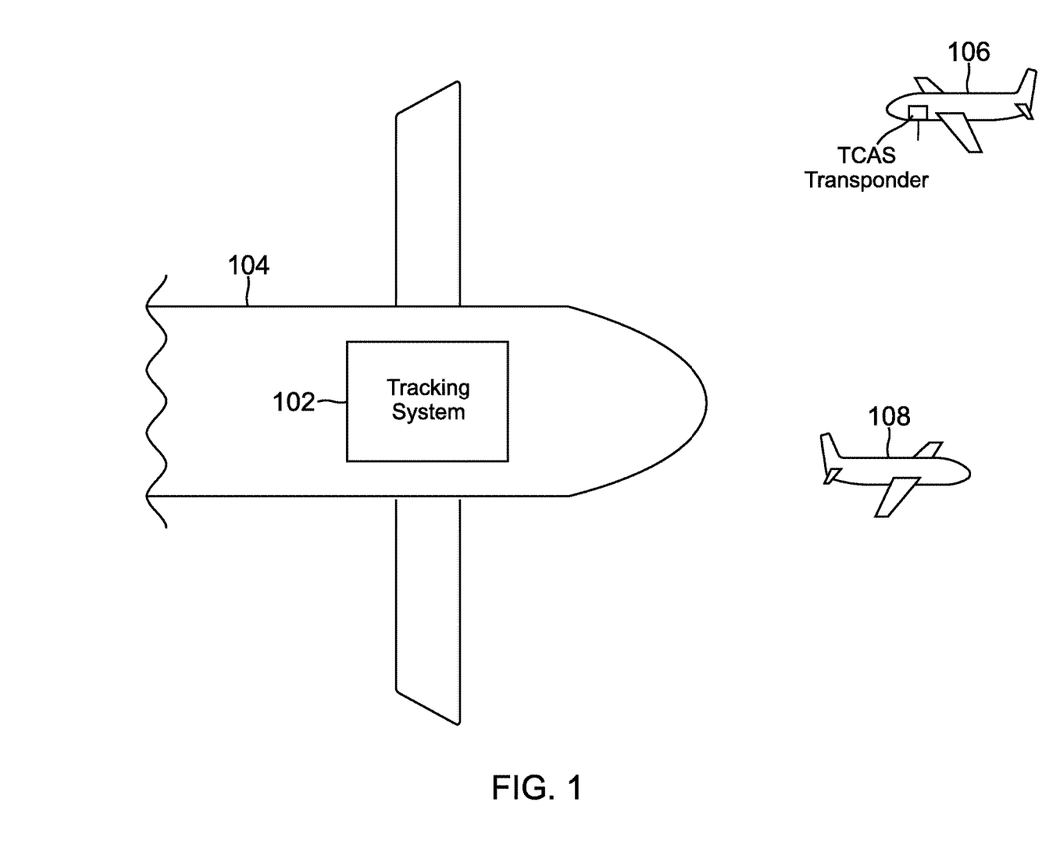
FIG. 1 is a block diagram of an example environment in which a PHD filter based tracking system may be used.

FIG. 1 is a block diagram of an example environment in which a PHD filter based tracking system 102 may be used. In the example shown herein, the tracking system 102 is installed within an aircraft 104, however, the tracking system 102 can be installed within any vehicle or can be a standalone system. The tracking system 102 is configured to detect and track other objects in the environment. In this example, the tracking system 102 is configured to detect objects in the air such as intruder aircraft (IA) 106, 108. In an example, the tracking system 102 is part of a sense-and-avoid (SAA) system and the aircraft 104 is an unmanned aircraft system (UAS).

Figure 2:
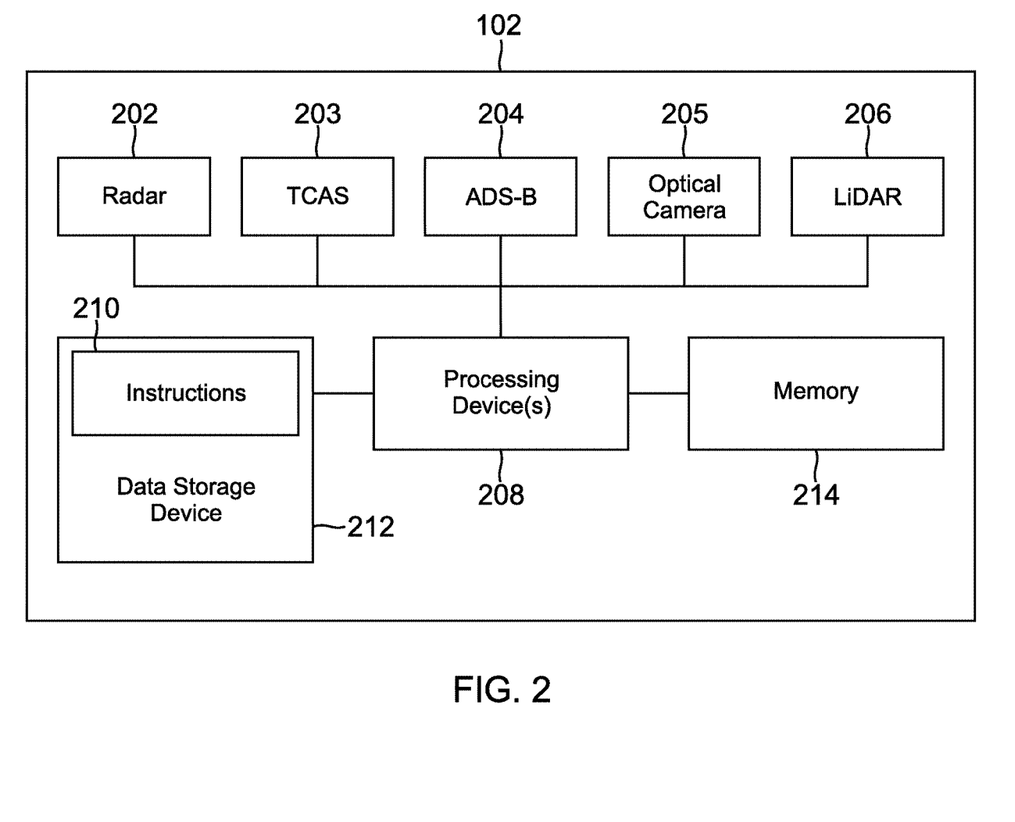
FIG. 2 is a block diagram of an example tracking system used in the environment of FIG. 1.

FIG. 2 is a block diagram of an example tracking system 102. The tracking system 102 includes a plurality of sensors 202-206 configured to detect objects in the environment around the sensors 202-206. The plurality of sensors 202-206 can include any suitable sensor such as a radar 202, TCAS sensor 203, ADS-B sensor 204, optical camera 205, and a LiDAR 206. Other sensors may be used as well. Additionally, any number of sensors including multiple of the same type of sensors may be used. The sensors 202-206 are coupled to one or more processing devices 208. The sensors 202-206 are configured to obtain measurements and send the measurements to the one or more processing devices 208. As mentioned above, some or all of the sensors 202-206 can be configured to send a track ID along with a measurement to the one or more processing devices 208.

The one or more processing devices 208 are configured to track a plurality of objects (such as intruder aircraft 106, 108) based on the measurements received from the sensors 202-206. To track the objects, the one or more processing devices 208 are configured to execute instructions 210 stored on the one or more data storage devices 212 coupled to the one or more processing devices 208. The instructions 210, when executed by the one or more processing devices 208, cause the one or more processing devices 208 to implement the actions to track objects based on the measurements from the sensors 202-206. The one or more processing devices 208 can include a central processing unit (CPU), microcontroller, microprocessor, (e.g., a digital signal processor), field programmable gate array (FPGA), application specific integrated circuit (ASIC), or other processing device. In certain examples, the one or more data storage devices 212 include a non-volatile electronic hardware device for storing machine readable data and instructions. In an example, the one or more data storage devices 212 store information on any appropriate computer readable medium used for storage of computer readable instructions or data structures. The computer readable medium can be implemented as any available media that can be accessed by the one or more processing devices 208. Suitable computer readable media may include storage media such as magnetic or optical media. For example, storage media can include a conventional hard disk, Compact Disk-Read Only Memory (CD-ROM), solid state drive (SSD), other flash memory, Read Only Memory (ROM), and Electrically Erasable Programmable ROM (EEPROM). The one or more processing devices 208 are also coupled to memory 214 that is configured to store data and instructions during execution by the one or more processing devices 208. The memory 214 can include volatile or non-volatile media such as Random Access Memory (RAM) (including, but not limited to, Synchronous Dynamic Random Access Memory (SDRAM), Double Data Rate (DDR) RAM, RAMBUS Dynamic RAM (RDRAM), and Static RAM (SRAM), etc.). In an example, the one or more processing devices 208 are configured to output information regarding the tracks of the objects to an output device such as a display device. In some examples, the one or more processing devices 208 provide the track information to a larger SAA system for controlling movement of an unmanned aircraft system.

Figure 3:
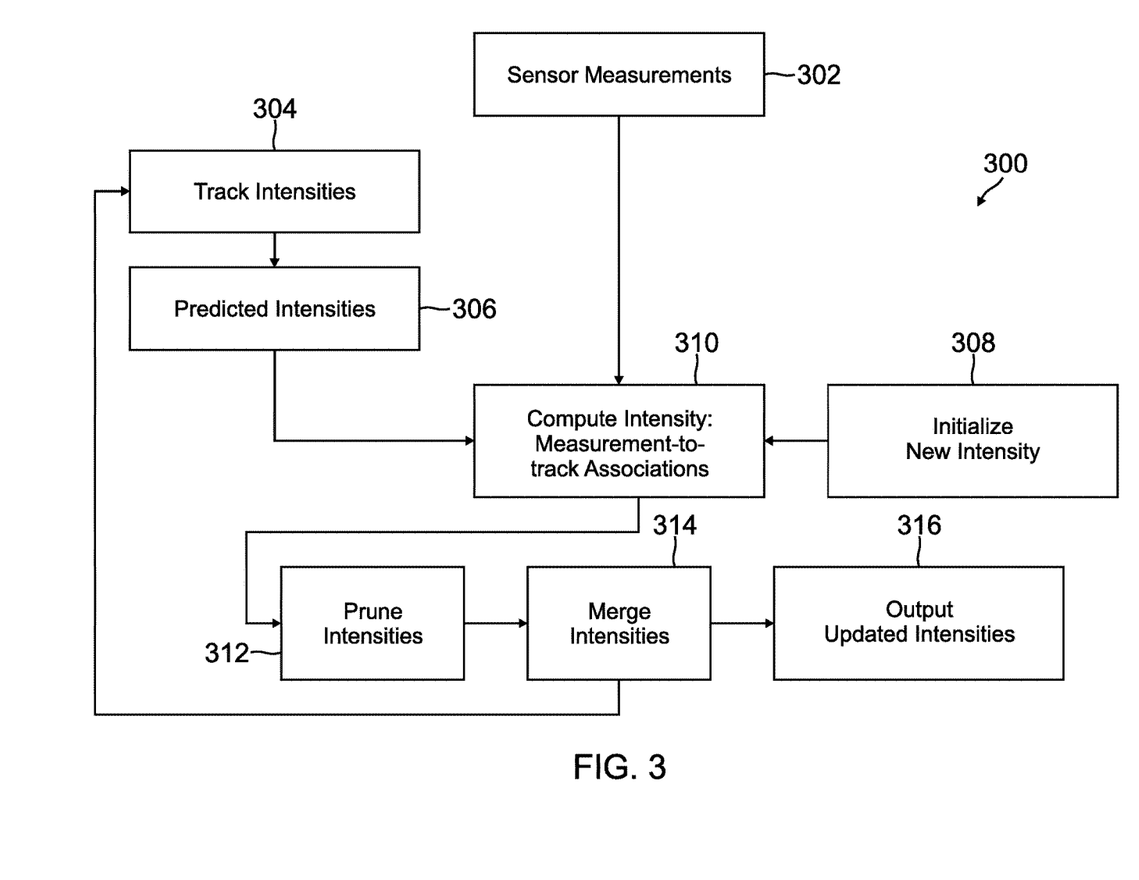
FIG. 3 is a flow diagram of an example method for tracking a plurality of objects with the tracking system of FIG. 2.

FIG. 3 is a flow diagram of an example method 300 for tracking a plurality of objects with the tracking system 102. The tracking system 102 implements a loop that computes a plurality of intensities and updates the intensities during each loop based on newly obtained measurements from the sensors 202-206. The loop operates in real time to track a plurality of objects that are measured by the sensors 202-206. As discussed above, the loop implements a probabilistic hypothesis density (PHD) filter to update the intensities. The PHD filter loop attempts to maintain a single intensity for each object being tracked. In the case of a tracking system 102 for an aircraft 104, the PHD filter loop attempts to maintain a single intensity for each intruder aircraft 106, 108, and/or other airborne object within a field-of-view of a sensor 202-206. During a given loop, one or more intensities are maintained corresponding to the number of objects being tracked at that time. Each iteration through the loop updates each intensity being maintained to the next time step unless the particular intensity is deleted (no longer tracked).

The tracking method 300 operates on measurements from the sensors 202-206 (block 302). Some or all of the measurements have a track ID provided therewith from the respective sensor 202-206. Accordingly, one or more measurements and one or more associated track IDs are provided by the sensors 202-206.

The tracking method 300 utilizes the track IDs provided by the sensors 202-206 to determine whether to merge two or more intensities together. The tracking method 300 utilizes the fact that the track ID provided by a sensor 202-206 indicates a potential correlation with previous measurements to determine which intensities to merge together. In order to do this, the tracking method 300 associates one or more track IDs with an intensity. In some examples, each intensity has at least one track ID associated therewith. In other examples, however, some of the intensities do not have any track IDs associated therewith. In any case, the intensities that do have a track ID associated therewith can proceed through the method 300 as described herein. Any intensity that does not have a track ID associated therewith can be analyzed for merging in any suitable manner including in a manner known to those skilled in the art. Actions to analyze such intensities that do not have a track ID associated therewith are not shown in FIG. 3.

As mentioned above, each loop of method 300 updates each intensity that is not deleted to the next time step. The length of time corresponding to a time step can be determined in any suitable manner, such as based on the frequency of measurements provided by one or more of the sensors 202-206. Each loop operates on one or more intensities (block 304) output from the previous iteration of the loop. In examples where the tracking system 102 provides tracks of objects to an SAA system, the one or more intensities are output to the SAA system as the tracks for that time step. Each of the one or more intensities (block 304) progresses through multiple intermediate stages during updating by method 300. An intensity that has completed updating for a given time step and is output (e.g., to an SAA system) is referred to herein as a "track intensity". Accordingly, the one or more intensities input into a loop of method 300 are also referred to herein as one or more "track" intensities.

Ignoring any track intensities that do not have a track ID associated therewith (as discussed above), each of the one or more track intensities input into the loop has a respective one or more track IDs associated therewith. Each of these track IDs corresponds to one or more measurements from a sensor 202-206 that have been used to update (in a previous time step) the track intensity with which the respective track ID is associated. Accordingly, each track intensity of the one or more track intensities has a respective one or more track IDs associated therewith; wherein the respective one or more track IDs correspond to one or more measurements that have been used to update that track intensity. The respective one or more track IDs can correspond to measurements that have been used to update the track intensity in any past time step. More detail regarding the process of associating one or more track IDs with a track intensity is provided below.

To update the one or more intensities, a predicted intensity is computed (block 306) for each of the one or more intensities. These one or more predicted intensities can be computed in any suitable manner including in ways known to those skilled in the art. Additionally, one or more new intensities can be created (block 308). The new intensities can be created in any suitable manner including in ways known to those skilled in the art.

Once the one or more predicted intensities and any new intensities are generated, measurement-to-track associations can be computed (block 310) based on the one or more measurements from the sensors 202-206. Computing a measurement-to-track association results in generating a measurement-to-track intensity by updating a predicted or new intensity with one of the measurements such that the resulting measurement-to-track intensity is the predicted/new intensity adjusted to incorporate the measurement. The process of generating any measurement-to-track intensities can be performed in any suitable manner including in a manner known to those skilled in the art.

The one or more predicted intensities, any new intensities, and any measurement-to-track intensities are then further processed by pruning (block 312). Pruning includes analyzing the one or more predicted intensities, any new intensities, and any measurement-to-track intensities to determine whether to delete any of the intensities. Among other things, pruning attempts to delete intensities that are not tracking an actual object. Any appropriate manner of pruning can be used including a manner known to those skilled in the art.

Any predicted intensities, new intensities, and measurement-to-track intensities that remain (i.e., are not deleted) after pruning are analyzed to determine whether to merge two or more of the intensities together (block 314). To determine whether to merge any of the intensities, track IDs associated with the respective intensities are compared. The intensities are then selectively merged based on whether their respective track IDs match.

As mentioned above, each of the predicted intensities, new intensities, and measurement-to-track intensities that is processed by method 300 has one or more track IDs associated therewith. The one or more track IDs associated with a predicted intensity are the same one or more track IDs as were associated with the track intensity from which the predicted intensity was created. For a new intensity, the one or more track IDs associated therewith can be one or more track IDs from any measurements used to create the new intensity. For example, a new intensity can be created based on a measurement in the one or more measurements (block 302) that is not used for a measurement-to-track association. Such a measurement can be determined to correspond to a possible new object and, therefore, can be used to create a new intensity based thereon. A track ID for the new intensity, therefore, can correspond to the measurement that was used to create the intensity. For a measurement-to-track intensity, the one or more track IDs associated therewith can be one or more track IDs from any measurements used to create the measurement-to-track intensity. For example, a measurement-to-track intensity can be created based on a determination that a measurement corresponds to a predicted/new intensity. Then, a measurement-to-track intensity can be created based on that measurement-predicted/new intensity pair. Such a measurement-to-track intensity can have the track ID from the measurement used to create the measurement-to-track intensity associated therewith. In an example, the one or more track IDs from the predicted/new intensity used to create the measurement-to-track intensity is not associated with the measurement-to-track intensity. In an alternative example, the one or more track IDs from the predicted/new intensity used to create the measurement-to-track intensity is associated with the measurement-to-track intensity along with the track ID from the measurement used to create the measurement-to-track intensity.

In any case, each of the predicted intensities, new intensities, and measurement-to-track intensities that is processed by method 300 has one or more track IDs associated therewith and these track IDs are used to determine whether to merge two or more of the track IDs. In an example, to determine whether to merge two or more of the track IDs, the track IDs among the predicted intensities, new intensities, and measurement-to-track intensities are compared to identify any matching track IDs. That is, the one or more track IDs from each of the predicted/new/measurement-to-track intensities is compared to the one or more track IDs from each other predicted/new/measurement-to-track intensity. If a match occurs for any intensity pair, that intensity pair is further considered for merging. For example, if a first intensity includes a first set of one or more track IDs and a second intensity includes a second set of one or more track IDs, the first intensity-second intensity pair can be analyzed for merging by comparing the first set of track IDs to the second set of track IDs. If any track IDs in the first set of track IDs match a track ID in the second set of track IDs, then the first intensity-second intensity pair can be further analyzed for merging. A match occurs when a track ID is the same as another track ID.

In addition to using the comparison between the associated track IDs for an intensity pair to determine whether to merge the pair of intensities, a statistical distance test is also used. The statistical distance test includes computing a statistical distance between an intensity and a measurement. Any suitable distance test can be used, such as a Malhanobis distance test. In particular, a statistical distance can be computed for an intensity pair and then the intensity pair can be selectively merged based on whether the statistical distance is below a threshold. The threshold can be selected in any suitable manner.

In an example, a statistical distance is computed for each pair of intensities. That is, a statistical distance is computed between each intensity and each other intensity that is not pruned (block 312). If any of the intensity pairs have at least one matching track ID and have a statistical distance that is below a threshold, that intensity pair is clustered together. In an example, any intensities that are clustered together are merged after analysis of all intensity pairs for merging. If either there is no matching track ID or the statistical distance is above the threshold, then that intensity pair is not clustered together based on that analysis. In this example, the track ID comparison and statistical distance test is repeated for each intensity pair in the intensities that are not pruned.

The goal of merging is to combine any intensities that correspond to the same object being tracked such that only one intensity is present for each object. Accordingly, more than two intensities may be merged into a single intensity. In an example, therefore, intensities identified to be merged are clustered together prior to merging. Clustering is an association between two or more intensities that are to be merged, but are not yet merged. The intensities can be clustered prior to merging in order to allow analysis of all possible intensity pairs before any intensity pairs are merged. In such an example, the outcome of the track ID comparison and the statistical test is that the corresponding intensity pair are clustered together and are merged together with any other intensities in that cluster after analysis of all intensity pairs.

Since more than two intensities may be clustered together, it is possible that the intensities in the intensity pair that are not clustered based on track ID comparison and the statistical test could still be placed in the same cluster later on. For example, if the second intensity discuss above is already in a cluster with a third intensity, and the first intensity discussed above is compared with the second intensity for merging, but the first intensity-second intensity pair does not meet the criteria for merging, the first intensity will not be clustered with the second intensity based on this analysis. However, if the first intensity-third intensity pair does meet the criteria for merging, the first intensity will be placed in the cluster with the third intensity which also includes the second intensity. Thus, the first intensity will be clustered with the second intensity even though the first intensity-second intensity pair does not meet the criteria for merging. In this way, more than two intensities can be clustered together for merging.

In another example, instead of computing a statistical distance for each possible intensity pair, a statistical distance test is selectively computed based on whether any matching track IDs are present for an intensity pair. For example, for the intensity pair discussed above that includes the first intensity and the second intensity, if any of the first set of track IDs matches any of the second set of track IDs, then a statistical distance is computed for the first intensity-second intensity pair. If that statistical distance is below a threshold, then the first intensity and second intensity are clustered together. If the statistical distance is above the threshold, then the first intensity and second intensity are not clustered based on this analysis. If, however, none of the first set of track IDs match any of the second set of track IDs, then the statistical distance is not computed and the first intensity and second intensity are not clustered based on this analysis. Such a process can reduce the amount of computation necessary because statistical distances are not computed for intensity pairs that cannot be clustered based on the track ID comparison. Such a process can be repeated for each intensity pair.

Additionally, in some examples, the track ID comparison is selectively performed based on whether there are any of the same type of tracks IDs between two pairs. For example, if a first intensity has only one track ID associated therewith and it is an ICAO aircraft address from a TCAS mode S sensor and a second intensity has only one track ID associated therewith and it is from a radar, the two track IDs will not match even though the intensities may correspond to the same object. These two track IDs will not match because they are of a different type; the first track ID from the TCAS mode S sensor is an ICAO aircraft address and the second track ID from the radar is a sensor specific ID, not an ICAO aircraft address. Similarly, if a first sensor specific track ID is from a first sensor and a second sensor specific track ID is from a second sensor, they also will not match even if they correspond to the same object. To take this into account, some examples selectively perform the track ID comparison based on whether there are any track IDs of the same type between a pair of intensities. If there are two track IDs of the same type, the track ID comparison is performed, and the decision of whether to merge is made based thereon. If there are not two track IDs of the same type, the track ID comparison is not performed and the decision of whether to merge is based only on the statistical distance.

Using the example intensities described above where a first intensity has a first set of one or more track IDs associated therewith and a second intensity has a second set of one or more track IDs associated therewith, a determination is made as to whether there are any track IDs of the same type in both the first set of track IDs and the second set of track IDs. Such a determination can be made in any suitable manner such as based on a type identifier included in the track ID. For example, a track ID from a first sensor may be RDR1XXXX, where "RDR1" is the type identifier indicating that the track ID is from "radar 1" and "XXXX" is four characters for the unique identifier corresponding to the object being tracked. Similarly, a track ID from a second sensor may be LDR1XXXX, where "LDR1" is the type identifier indicating that the track ID is from "LiDAR 1" and "XXXX" is four characters for the unique identifier corresponding to the object being tracked. A track ID that is an ICAO aircraft address can be "ICAOXXXXXX", where "ICAO" is the type identifier indicating that the track ID is an ICAO aircraft address and "XXXXXX" is the hex unique identifier for the aircraft. Other examples may also be used. In such examples, if a track ID from the first set of track IDs has the same type identifier as a track ID from the second set of track IDs, the track ID comparison is performed with those track IDs. If there are not track IDs from the first set of track IDs that have the same type identifier as any track IDs in the second set of track IDs, then the track ID comparison is not performed with those track IDs.

For track IDs corresponding to aircraft, the track ID comparison can be performed in two circumstances: if the first and second set of track IDs both include a track ID that is an ICAO aircraft address or if the first and second set of track IDs both include a track ID from the same sensor that correlates measurements across time. If neither of these situations occur, the track ID comparison is not performed for the two intensities and the merging decision is based solely on the statistical distance between the two intensities.

In any case, one of the processes described above is performed on the plurality of intensities that are not pruned (block 312) to merge together appropriate intensities. The act of combining intensities that are identified for merging can be performed in any suitable manner including in a manner known to those skilled in the art. In an example, a merged intensity (an intensity that is formed from a combination of two or more intensities (block 314)) has associated therewith all of the track IDs from each of the intensities that were combined to form the merged intensity. Thus, if a predicted intensity having a first track ID and a second track ID associated therewith is merged with a new intensity having a third track ID associated therewith, the resulting merged intensity has the first, second, and third track IDs associated therewith. In an example, an intensity that does not have any track IDs associated therewith is analyzed with another intensity for merger based solely on the statistical distance test as well.

In an example, the statistical distance threshold used to determine whether to merge a pair of intensities is dynamically selected based on which sensor has a track ID associated with the intensities in the pair. The sensor having a track ID associated with an intensity can be determined based on the type of track ID discussed above. For example, a first sensor could be a sensor that provides an ICAO aircraft address. A second sensor could be a radar that correlates measurements and corresponding track IDs over time. A third sensor could be a LiDAR that correlates measurements and corresponding track IDs over time. In any case, the statistical distance threshold can be selected based on the sensor(s) having track ID(s) associated with the pair of intensities. Moreover, in situations where a track ID comparison occurs, the statistical distance threshold can be selected based on which sensor provided the track IDs that are being compared. For example, if both a first intensity and a second intensity include track IDs from a radar, a statistical distance threshold corresponding to the radar can be used. If both a first intensity and a second intensity include ICAO aircraft addresses, a statistical distance threshold corresponding to a sensor outputting an ICAO aircraft address can be used. In an example, if a first intensity includes only a track ID from a radar and a second intensity includes only an ICAO aircraft address, a statistical distance corresponding to a radar-ICAO aircraft address pair can be used. Additionally, a statistical distance threshold can correspond to a set of more than two sensors if more than two track IDs are included in an intensity pair. As can be seen, any number of different statistical thresholds can be used depending on the particular sensor(s) having track IDs associated with the intensity pair. In an example, the statistical distance thresholds are set based on the accuracy of the sensor having a track ID associated with the intensity pair. In particular, for sensors having poorer accuracy a higher threshold is used for the statistical distance to make it more likely that intensities corresponding to the same object are merged.

After merging intensities, the resulting intensities are output from the loop as the track intensities corresponding to that time step. These track intensities are input into the next iteration of the loop to be updated to the next time step as described above. These track intensities are also output for display and/or further analysis, such as by an SAA system (block 316).

A track intensity output by the loop maintains all track IDs from any intensity used to create that track intensity. For example, if no intensities are merged with a given track intensity as it is updated to the next time step, the updated track intensity maintains the same track ID(s) as the previous track intensity. If, however, a first intensity is merged (block 314) with a second one or more track intensities to create a merged track intensity, that merged track intensity is output as an updated track intensity having associated therewith all the track IDs from the first intensity and the second one or more intensities. If an intensity is pruned (block 312), that intensity is deleted (no longer maintained) and, therefore, is not present in the track intensities being output. Any track IDs associated with a pruned intensity are not considered for clustering (block 310) or passed on to be merged (block 314) by the pruning action (block 312). Finally, if a measurement-to-track intensity is not merged with any other intensities and an updated track intensity is created based on the measurement-to-track intensity, the track ID(s) associated with the measurement-to-track intensity are associated with the updated track intensity. No other track IDs are associated with such an updated track intensity. Similarly, if a new intensity is not merged with any other intensities and an updated track intensity is created based thereon, the track ID associated with the new intensity is associated with the updated track intensity. No other track IDs are associated with such an updated track intensity.

Example Embodiments

Example 1 includes a method of tracking multiple objects with a probabilistic hypothesis density filter, the method comprising: generating a first intensity by combining a first one or more measurements from a first one or more sensors, wherein a first set of track IDs includes one or more track IDs provided by the first one or more sensors corresponding to their respective measurement in the first one or more measurements, wherein the first intensity includes a weight, a state mean vector, and a state covariance matrix of statistics of a track of an object at a first time; generating a second intensity by combining a second one or more measurements from a second one or more sensors, wherein a second set of track IDs includes one or more track IDs provided by the second one or more sensors corresponding to their respective measurement in the second one or more measurements, wherein the second intensity includes a weight, a state mean vector, and a state covariance matrix of statistics of a track of an object at the first time; comparing the first set of track IDs to the second set of track IDs; and selectively merging the first intensity with the second intensity based on whether any track IDs in the first set of track IDs match any track IDs in the second set of track IDs.

Example 2 includes the method of Example 1, comprising: computing a statistical distance between the first intensity and the second intensity; and wherein selectively merging includes selectively merging the first intensity with the second intensity based on whether the statistical distance is less than a threshold.

Example 3 includes the method of Example 2, wherein selectively merging includes merging the first intensity with the second intensity if any track IDs in the first set of track IDs match any track IDs in the second set of track IDs and if the statistical distance is less than a threshold.

Example 4 includes the method of any of Examples 1-3, comprising: if any track IDs in the first set of track IDs match any track IDs in the second set of track IDs, computing a statistical distance between the first intensity and the second intensity; and if the statistical distance is less than a threshold, merging the first intensity with the second intensity.

Example 5 includes the method of Example 4, wherein computing a statistical distance includes computing a Malhanobis distance.

Example 6 includes the method of any of Examples 1-5, comprising: generating a plurality of intensities each having one or more track IDs associated therewith, wherein the first and second intensity are in the plurality of intensities; and wherein selectively merging includes merging the plurality of intensities to produce one or more merged intensities, wherein a given intensity is merged with one or more other intensities if any of one or more track IDs associated with the given intensity match any of one or more track IDs associated with the one or more other intensities and if a statistical distance between the given intensity and the one or more other intensities having a matching track ID is less than a threshold.

Example 7 includes the method of any of Examples 1-6, wherein each track ID of the first set of track IDs and the second set of track IDs is one of an identifier assigned by a sensor to a set of measurements obtained by that sensor that are correlated across time, or an international civil aviation organization (ICAO) aircraft address received by a sensor and corresponding to a respective measurement for that sensor.

Example 8 includes the method of any of Examples 1-7, wherein the first intensity includes one of a predicted intensity, a measurement-to-track intensity, and a new intensity and the second intensity includes one of a predicted intensity, a measurement-to-track intensity, and a new intensity.

Example 9 includes a method of tracking multiple objects with a probabilistic hypothesis density filter, the method comprising: generating a first intensity by combining a first one or more measurements from a first one or more sensors, wherein a first set of track IDs includes one or more track IDs provided by the first one or more sensors corresponding to their respective measurement in the first one or more measurements, wherein the first intensity includes a weight, a state mean vector, and a state covariance matrix of statistics of a track of an object at a first time; generating a second intensity by combining a second one or more measurements from a second one or more sensors, wherein a second set of track IDs includes one or more track IDs provided by the second one or more sensors corresponding to their respective measurement in the second one or more measurements, wherein the second intensity includes a weight, a state mean vector, and a state covariance matrix of statistics of a track of an object at the second time; selectively comparing the first set of track IDs to the second set of track IDs based on whether there are any track IDs in the first set of track IDs and the second set of track IDs that are the same type; and selectively merging the first intensity with the second intensity based on whether any track IDs in the first set of track IDs match any track IDs in the second set of track IDs.

Example 10 includes the method of Example 9, wherein selectively comparing includes: if the first set of track IDs includes a first track ID that is an international civil aviation organization (ICAO) aircraft address and the second set of track IDs includes a second track ID that is an ICAO aircraft address, then: comparing the first track ID to the second track ID; if the first track ID matches the second track ID, then: computing a statistical distance between the first intensity and the second intensity; and merging the first intensity and the second intensity if the statistical distance is less than a first threshold; if the first set of track IDs includes a first track ID from a first sensor that correlates measurements across time and the second set of track IDs includes a second track ID from the first sensor, then: comparing the first track ID to the second track ID; if the first track ID matches the second track ID, then: computing a statistical distance between the first intensity and the second intensity; and merging the first intensity and the second intensity if the statistical distance is less than a second threshold; if either of the first and second set of track IDs do not include a track ID that is an ICAO aircraft address or if either of the first and second set of track IDs do not contain a track ID from the same sensor which correlates measurements across time, then: computing a statistical distance between the first intensity and the second intensity; and merging the first intensity and the second intensity if the statistical distance is less than a third threshold; otherwise, not merging the first intensity and the second intensity.

Example 11 includes the method of Example 10, wherein the first threshold is set based on which sensor provided the first track ID and which sensor provided the second track ID, wherein the second threshold is set based on the first sensor, wherein the third threshold is set based the one or more sensors that provided the first set of track IDs and the second set of track IDs.

Example 12 includes the method of Example 11, wherein the first threshold, second threshold, and third threshold are set higher for a type of sensor having a poorer accuracy.

Example 13 includes the method of any of Examples 9-12, wherein each track ID of the first set of track IDs and the second set of track IDs is one of an identifier assigned by a sensor to a set of measurements obtained by that sensor that are correlated across time, or an ICAO aircraft address received by a sensor and corresponding to a respective measurement for that sensor.

Example 14 includes the method of any of Examples 9-13, wherein the first intensity includes one of a predicted intensity, a measurement-to-track intensity, and a new intensity and the second intensity includes one of a predicted intensity, a measurement-to-track intensity, and a new intensity.

Example 15 includes the method of any of Examples 9-14, wherein selectively merging includes clustering two or more intensities identified for merging together prior to combining the two or more intensities to create a merged intensity.

Example 16 includes a method of tracking multiple objects with a probabilistic hypothesis density filter, the method comprising: providing a plurality of intensities, each intensity of the plurality of intensities including a weight, a state mean vector, and a state covariance matrix of statistics of a track of a respective object, wherein each intensity has one or more track IDs associated therewith, wherein each track ID associated with a respective intensity corresponds to a measurement that contributed to that respective intensity; and merging the plurality of intensities based on whether any of the one or more track IDs among the plurality of intensities match and based on whether a statistical distance between any of the plurality of intensities is less than a threshold.

Example 17 includes the method of Example 16, wherein merging the plurality of intensities includes: for each match between a first track ID and a second track ID, computing a statistical distance between a first intensity associated with the first track ID and a second intensity associated with the second track ID; and if the statistical distance is less than a threshold, merging the first intensity with the second intensity.

Example 18 includes the method of any of Examples 16-17, wherein the threshold is adjustable based on a type of sensor that provided the first track ID and a type of sensor that provided the second track ID.

Example 19 includes the method of any of Examples 16-18, wherein the plurality of intensities include one or more of a predicted intensity, a measurement-to-track intensity, and a new intensity.

Example 20 includes the method of any of Examples 16-19, wherein each track ID of the one or more track IDs is one of an identifier assigned by a sensor to a set of measurements obtained by that sensor that are correlated across time, or an international civil aviation organization (ICAO) aircraft address received by a sensor and corresponding to a respective measurement for that sensor.

What is claimed is:

1. A method of tracking multiple objects with a probabilistic hypothesis density filter, the method comprising:
receiving reflected signals in a first one or more sensors and a second one or more sensors from an object in an environment around a vehicle, wherein the first one or more sensors and the second one or more sensors are onboard the vehicle;
detecting the received reflected signals in the first one or more sensors and the second one or more sensors;
computing a first one or more measurements based on the detected reflected signals in the first one or more sensors;
computing a second one or more measurements based on the detected reflected signals in the second one or more sensors;
generating a first intensity by combining the first one or more measurements, wherein a first set of track identifiers (IDs) includes one or more track IDs provided by the first one or more sensors corresponding to a respective measurement in the first one or more measurements, wherein the first intensity includes a weight, a state mean vector, and a state covariance matrix of statistics of a track of the object at a first time;
generating a second intensity by combining the second one or more measurements, wherein a second set of track IDs includes one or more track IDs provided by the second one or more sensors corresponding to a respective measurement in the second one or more measurements, wherein the second intensity includes a weight, a state mean vector, and a state covariance matrix of statistics of a track of the object at the first time;
comparing the first set of track IDs to the second set of track IDs; and
selectively merging the first intensity with the second intensity based on whether any track IDs in the first set of track IDs match any track IDs in the second set of track IDs.

2. The method of claim 1, further comprising:
computing a statistical distance between the first intensity and the second intensity; and
wherein selectively merging includes selectively merging the first intensity with the second intensity based on whether the statistical distance is less than a threshold.

3. The method of claim 2, wherein selectively merging includes merging the first intensity with the second intensity if any track IDs in the first set of track IDs match any track IDs in the second set of track IDs and if the statistical distance is less than a threshold.

4. The method of claim 1, further comprising:
if any track IDs in the first set of track IDs match any track IDs in the second set of track IDs, computing a statistical distance between the first intensity and the second intensity; and
if the statistical distance is less than a threshold, merging the first intensity with the second intensity.

5. The method of claim 4, wherein computing a statistical distance includes computing a Malhanobis distance.

6. The method of claim 1, further comprising:
generating a plurality of intensities each having one or more track IDs associated therewith, wherein the first and second intensity are in the plurality of intensities; and
wherein selectively merging includes merging the plurality of intensities to produce one or more merged intensities, wherein a given intensity is merged with one or more other intensities if any of one or more track IDs associated with the given intensity match any of one or more track IDs associated with the one or more other intensities and if a statistical distance between the given intensity and the one or more other intensities having a matching track ID is less than a threshold.

7. The method of claim 1, wherein each track ID of the first set of track IDs and the second set of track IDs is one of an identifier assigned by a sensor to a set of measurements obtained by that sensor that are correlated across time, or an international civil aviation organization (ICAO) aircraft address received by a sensor and corresponding to a respective measurement for that sensor.

8. The method of claim 1, wherein the first intensity includes one of a predicted intensity, a measurement-to-track intensity, and a new intensity and the second intensity includes one of a predicted intensity, a measurement-to-track intensity, and a new intensity.

9. A method of tracking multiple objects with a probabilistic hypothesis density filter, the method comprising:
receiving reflected signals in a first one or more sensors and a second one or more sensors from an object in an environment around a vehicle, wherein the first one or more sensors and the second one or more sensors are onboard the vehicle;
detecting the received reflected signals in the first one or more sensors and the second one or more sensors;
computing a first one or more measurements based on the detected reflected signals in the first one or more sensors;
computing a second one or more measurements based on the detected reflected signals in the second one or more sensors;
generating a first intensity by combining the first one or more measurements, wherein a first set of track identifiers (IDs) includes one or more track IDs provided by the first one or more sensors corresponding to a respective measurement in the first one or more measurements, wherein the first intensity includes a weight, a state mean vector, and a state covariance matrix of statistics of a track of the object at a first time;
generating a second intensity by combining the second one or more measurements, wherein a second set of track IDs includes one or more track IDs provided by the second one or more sensors corresponding to a respective measurement in the second one or more measurements, wherein the second intensity includes a weight, a state mean vector, and a state covariance matrix of statistics of a track of the object at a second time;
selectively comparing the first set of track IDs to the second set of track IDs based on whether there are any track IDs in the first set of track IDs and the second set of track IDs that are the same type; and selectively merging the first intensity with the second intensity based on whether any track IDs in the first set of track IDs match any track IDs in the second set of track IDs;

wherein selectively comparing includes:

if the first set of track IDs includes a first track identifier (ID) that is an international civil aviation organization (ICAO) aircraft address and the second set of track IDs includes a second track ID that is an ICAO aircraft address, then:

comparing the first track ID to the second track ID;

if the first track ID matches the second track ID, then:

computing a statistical distance between the first intensity and the second intensity; and merging the first intensity and the second intensity if the statistical distance is less than a first threshold;

if the first set of track IDs includes a first track ID from a first sensor that correlates measurements across time and the second set of track IDs includes a second track ID from the first sensor, then:

comparing the first track ID to the second track ID;

if the first track ID matches the second track ID, then:

computing a statistical distance between the first intensity and the second intensity; and merging the first intensity and the second intensity if the statistical distance is less than a second threshold;

if either of the first and second set of track IDs do not include a track ID that is an ICAO aircraft address or if either of the first and second set of track IDs do not contain a track ID from the same sensor which correlates measurements across time, then:

computing a statistical distance between the first intensity and the second intensity; and merging the first intensity and the second intensity if the statistical distance is less than a third threshold;

otherwise, not merging the first intensity and the second intensity.

10. The method of claim 9, wherein the first threshold is set based on which sensor provided the first track ID and which sensor provided the second track ID, wherein the second threshold is set based on the first sensor, wherein the third threshold is set based the one or more sensors that provided the first set of track IDs and the second set of track IDs.

11. The method of claim 10, wherein the first threshold, second threshold, and third threshold are set higher for a type of sensor having a poorer accuracy.

12. The method of claim 9, wherein each track ID of the first set of track IDs and the second set of track IDs is one of an identifier assigned by a sensor to a set of measurements obtained by that sensor that are correlated across time, or an ICAO aircraft address received by a sensor and corresponding to a respective measurement for that sensor.

13. The method of claim 9, wherein the first intensity includes one of a predicted intensity, a measurement-to-track intensity, and a new intensity and the second intensity includes one of a predicted intensity, a measurement-to-track intensity, and a new intensity.

14. The method of claim 9, wherein selectively merging includes clustering two or more intensities identified for merging together prior to combining the two or more intensities to create a merged intensity.

15. A tracking system for a vehicle, comprising:

one or more processing devices onboard the vehicle;

a plurality of sensors onboard the vehicle and operatively coupled to the one or more processing devices; and one or more data storage devices onboard the vehicle and including instructions which, when executed by the one or more processing devices, cause the one or more processing devices to track multiple objects in an environment around the vehicle with a probabilistic hypothesis density filter, wherein the instructions cause the one or more processing devices to perform a method comprising:

detecting reflected signals received by a first one or more of the plurality of sensors, and a second one or more of the plurality of sensors, from an object in the environment around the vehicle;

computing a first one or more measurements based on the detected reflected signals in the first one or more of the plurality of sensors;

computing a second one or more measurements based on the detected reflected signals in the second one or more of the plurality of sensors;

generating a first intensity by combining the first one or more measurements, wherein a first set of track identifiers (IDs) includes one or more track IDs provided by the first one or more of the plurality of sensors corresponding to a respective measurement in the first one or more measurements, wherein the first intensity includes a weight, a state mean vector, and a state covariance matrix of statistics of a track of the object at a first time;

generating a second intensity by combining the second one or more measurements, wherein a second set of track IDs includes one or more track IDs provided by the second one or more of the plurality of sensors corresponding to a respective measurement in the second one or more measurements, wherein the second intensity includes a weight, a state mean vector, and a state covariance matrix of statistics of a track of the object at the first time;

comparing the first set of track IDs to the second set of track IDs; and selectively merging the first intensity with the second intensity based on whether any track IDs in the first set of track IDs match any track IDs in the second set of track IDs.

16. The tracking system of claim 15, wherein:

the vehicle comprises an aircraft; and the plurality of sensors comprise a radar, a traffic collision avoidance system (TCAS) sensor, an automatic dependent surveillance-broadcast (ADS-B) sensor, an optical camera, or a LiDAR.

* * * * *